United States Patent
Bertagna et al.

(10) Patent No.: US 6,389,035 B1
(45) Date of Patent: *May 14, 2002

(54) TRANSLATION HARDWARE ASSIST FOR DATA COMMUNICATION SWITCH

(75) Inventors: Drew Bertagna, Agoura Hills; Anees Narsinh, Pacific Palisades, both of CA (US)

(73) Assignee: Alcatel Internetworking, Inc., Calabasas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,299

(22) Filed: May 8, 1998

(51) Int. Cl.[7] .................................................. H04J 3/16
(52) U.S. Cl. ........................ 370/465; 370/413; 370/236
(58) Field of Search .......................... 370/236, 70, 480, 370/465, 375, 413, 429–434, 458, 229, 395, 407, 210, 442, 463, 449, 535, 473, 409, 351, 257; 200/84, 80; 710/104

(56) References Cited

U.S. PATENT DOCUMENTS

| | | | | |
|---|---|---|---|---|
| 4,058,672 A | * | 11/1977 | Crager et al. ................ | 370/473 |
| 4,488,293 A | * | 12/1984 | Haussmann et al. ......... | 370/535 |
| 5,041,963 A | * | 8/1991 | Ebersole et al. ............. | 370/407 |
| 5,768,257 A | * | 6/1998 | Khacherian et al. ......... | 370/229 |
| 5,862,136 A | * | 1/1999 | Irwin ........................... | 370/395 |
| 5,892,755 A | * | 4/1999 | Ben-Arie et al. ............ | 370/236 |
| 5,920,705 A | * | 7/1999 | Lyon et al. ................... | 370/409 |
| 6,094,430 A | * | 7/2000 | Hoogenboom ............... | 370/375 |

OTHER PUBLICATIONS

Mirchandani and Khanna, FDDI Technology & Application, Oct. 9, 1992, pp. 311–314.

Postel & Reynolds, IP and ARP on IEEE 802 Networks, Feb. 1988, Obsoletes: RFC–948, 14 sheets.

* cited by examiner

*Primary Examiner*—Wellington Chin
*Assistant Examiner*—Prenell Jones
(74) *Attorney, Agent, or Firm*—Christie, Parker & Hale, LLP (57) ABSTRACT

A protocol translation hardware assist for resolving protocol incompatibilities in a multi-protocol switching environment. Discrete information units are transferred seamlessly from inputs to disparate protocol outputs by writing inbound discrete information units into selected address spaces in allocated buffers in a transfer queue in a manner which accounts for protocol format differences while allowing for straightforward dequeueing. The hardware assist fragments inbound discrete information units into multiple outbound units and creates offsets indicated by destination protocol requirements. A bypass check may be implemented to avoid subjecting to the fragmentation inquiry discrete information units for which it can be inferred a priori that fragmentation is not required.

23 Claims, 11 Drawing Sheets

TRANSLATION HARDWARE ASSIST FOR DATA COMMUNICATION SWITCH

BACKGROUND OF THE INVENTION

The present invention relates to multi-protocol data communication switching and, more particularly, to methods and devices for facilitating protocol translations performed on discrete information units received on an input port in a first data communication protocol for transmission on an output port in a second data communication protocol, wherein the first and second protocols may be different.

Data communication switches transfer discrete information units between communication protocol domains. Where the source and destination protocol domains run different protocols, the switches must translate discrete information units into the protocol type operative in the destination protocol domain before forwarding can proceed. Protocol translation typically requires conversion of the inbound discrete information units to eliminate incompatibilities in the unit formats specified in the source and destination protocol domains. Examples of format incompatibilities include differences in unit header and/or trailer requirements and the maximum unit length. These or other incompatibilities may create the need to "fragment" the inbound discrete information unit into multiple outbound units and to reserve different byte lengths at the head and/or tail of the outbound units for unit headers and/or trailers. Conventional switches have relied heavily on central processing units (CPU) to resolve such incompatibilities. However, this substantial CPU reliance has often introduced intervening steps into the switching process which have caused latency and created additional queueing requirements. Switching efficiency has suffered as a result. Therefore, there is a need for methods and devices for more efficiently conducting translational switching operations in a multi-protocol switching environment.

SUMMARY OF THE INVENTION

In its most basic feature, the present invention provides a translation hardware assist for resolving protocol incompatibilities in a multi-protocol switching environment. Discrete information units are transferred from inputs to disparate protocol outputs by writing inbound discrete information units into selected address spaces in allocated buffers in a manner which accounts for protocol format differences while allowing for straightforward dequeueing. The hardware assist fragments inbound discrete information units which violate a maximum unit length for the destination protocol type into multiple outbound units and creates explicit header offsets (and may create implicit trailer offsets) to accommodate the headers (and trailers) required for the destination protocol type. By selectively writing allocated buffers to account for protocol format differences, dequeueing can be accomplished by simply reading from the buffers first in, first out.

In a preferred embodiment, the destination address in an inbound discrete information unit is resolved to translation assist values, including a header offset value, maximum transfer unit value and segment size value. If the length of the discrete information unit does not exceed the resolved maximum transfer unit value, fragmentation is not indicated, and the discrete information unit is written using direct memory access (DMA) into one or more logically contiguous buffers, after skipping at the beginning of the first buffer a number of bytes corresponding to the resolved header offset value. If the length of a discrete information unit exceeds the resolved maximum transfer unit value, fragmentation is indicated, and the discrete information unit is fragmented into multiple segments corresponding to the resolved segment size value and transferred DMA into sets of one or more buffers each, after skipping before each segment a number of bytes corresponding to the resolved header offset value. Protocol-appropriate header/trailer information may be added to the residual spaces in the buffers to complete formation of the outbound discrete information units. The outbound discrete information units are eventually read DMA from the buffers in a predetermined logical order, such as first in, first out. A translational switching operation is therefore carried out seamlessly with the expedient of a straightforward hardware assist. The translation assist values may be stored in translation assist registers configured for each different protocol type operative in the switching environment which may be selectively consulted on a unit-by-unit basis through associative comparison with the destination addresses.

In another preferred embodiment, a bypass check is implemented which may further expedite the translation hardware assist. In the hardware assist with bypass mode, the largest header offset value for any protocol type operative in the switching environment is preselected and a bypass check based on the known or resolved protocol type of the inbound discrete information unit is performed. If the bypass check indicates that the inbound discrete information unit is of the protocol type which supports the shortest maximum transfer units relative to all other protocol types operative in the switching environment, it can be inferred that fragmentation of the inbound discrete information unit is not required and the discrete information unit is transferred DMA into one or more buffers after skipping a number of bytes corresponding to the preselected header offset value. If the bypass check indicates that the discrete information unit is not of the shortest maximum transfer unit protocol type operative in the switching environment, it can be inferred that fragmentation may be required. In that event, the header offset value, maximum transfer unit value and segment size value are resolved and the outbound discrete information unit is queued and dequeued as in the previous embodiment. Through the expedient of preselecting an offset value and performing the bypass check on inbound discrete information units, unnecessary fragmentation inquiries may be avoided.

These and other aspects of the present invention may be better understood by reference to the following detailed description taken in conjunction with the accompanying drawings which are briefly described below. Of course, the actual scope of the invention is defined by the appended claims.

DETAILED DESCRIPTION OF THE PREFERRED EMBODIMENT

Figure 1:
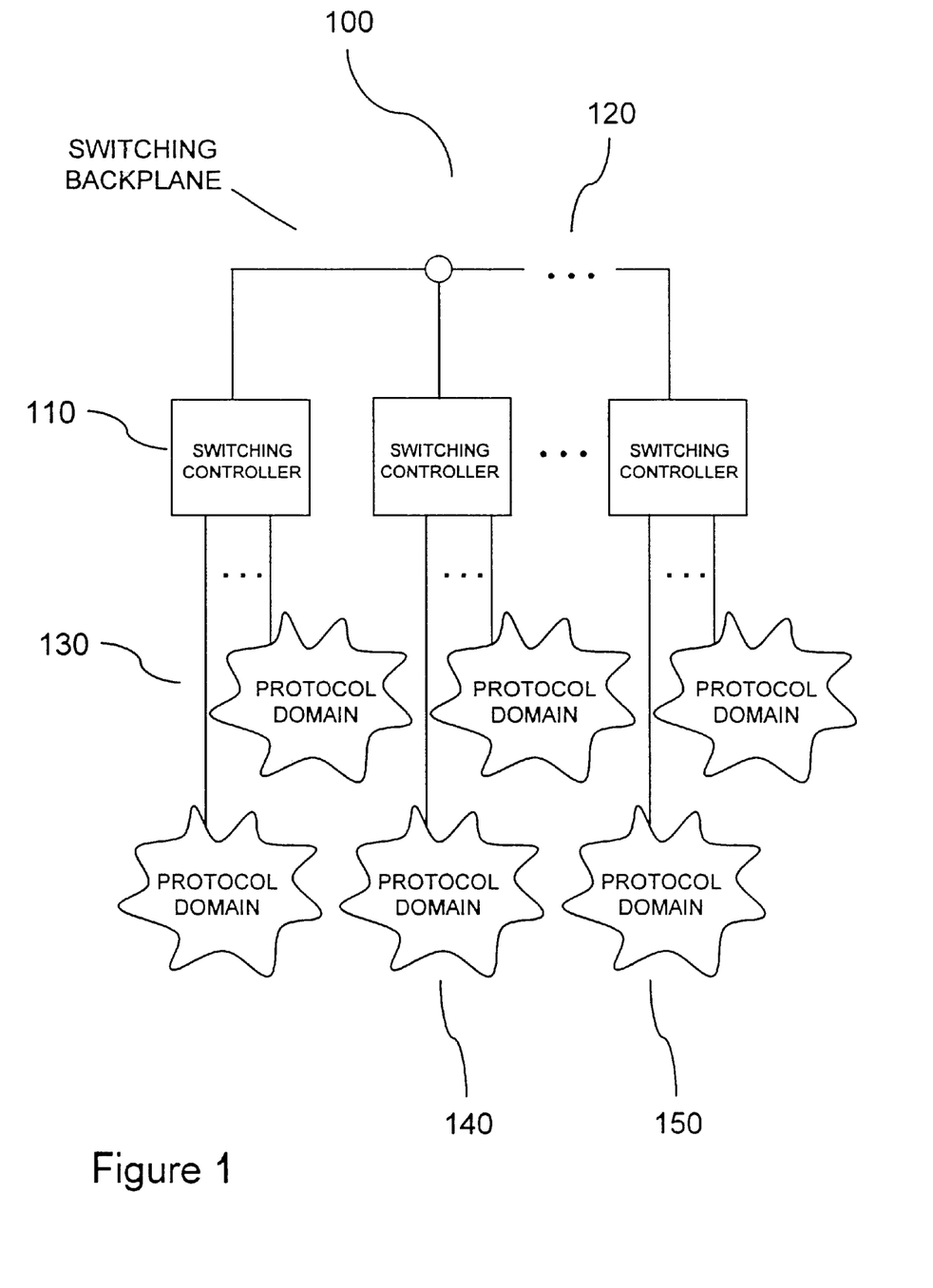
FIG. 1 is a block diagram illustrating a multi-protocol switching environment in accordance with the present invention.

In FIG. 1, a multi-protocol data communication switch in which the present invention is operative is shown. Switch 100 includes switching controllers 110 which communicate across a switching backplane 120. Switching controllers 110 are each associated with multiple protocol domains 130, 140, 150. Protocol domains 130, 140, 150 each include domains operative in at least two different communication protocols. The different protocols may include, by way of example, Ethernet, Token Ring, Fiber Distributed Data Interface (FDDI) and Asynchronous Transfer Mode (ATM) in all of their various forms. Each protocol domain includes one or more nodes which communicate over protocol domain interfaces with their associated switching controller in a particular communication protocol. Nodes may include, by way of example, PCs, workstations, printers and servers.

Figure 2:
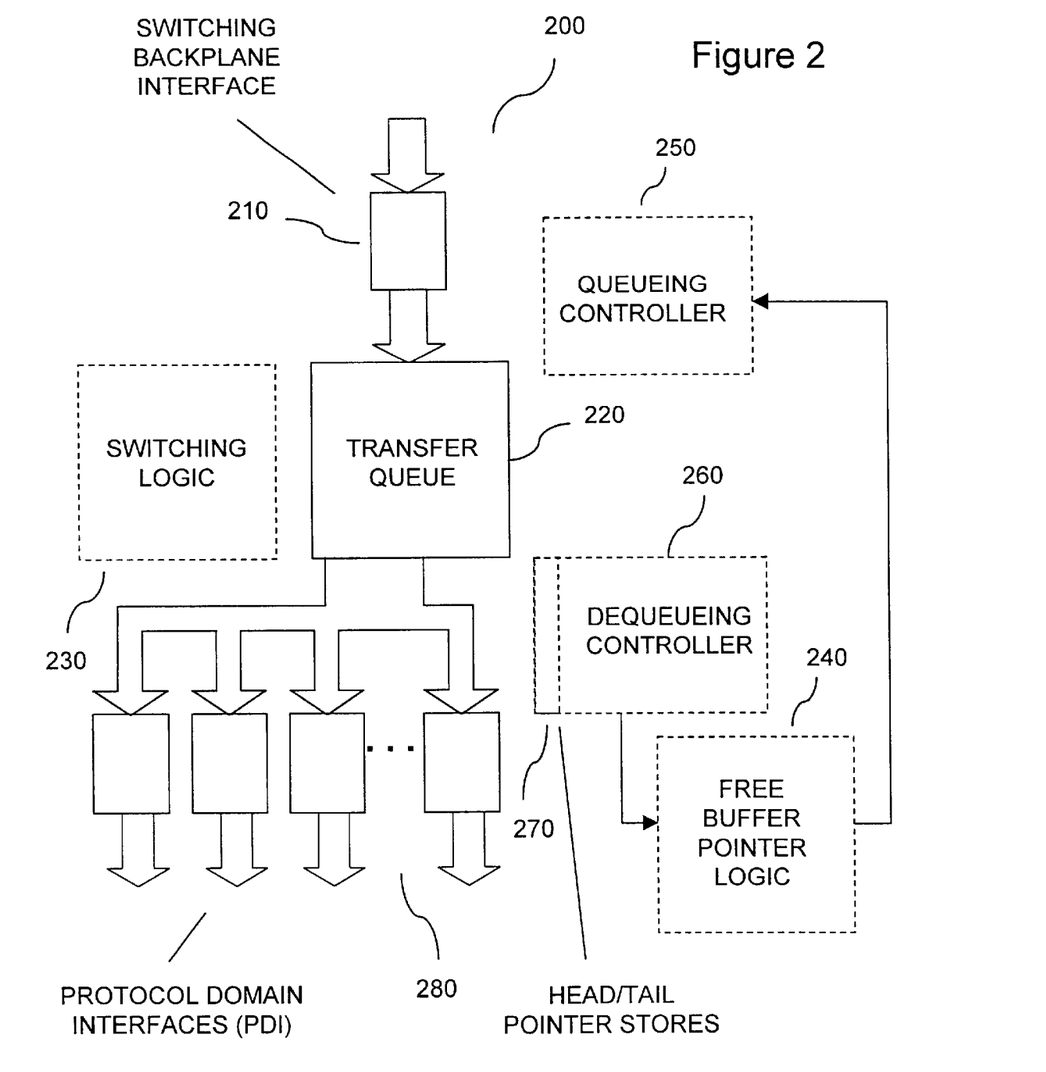
FIG. 2 is a block diagram illustrating a section of a switching controller operative within the switching environment of FIG. 1, in a preferred embodiment.

Referring to FIG. 2, in a preferred embodiment of the invention, the section of a switching controller used for receiving discrete information units on a switching backplane interface 210 and transferring them to destination protocol domain interfaces 280 is shown. In the basic switching operation, discrete information units transmitted by one switching controller over a switching backplane are received at switching backplane interface 210, appropriate protocol translations are made, and the discrete information units are eventually forwarded to destination protocol domain interfaces (abbreviated herein as "PDI") 280. Protocol translations are made in transfer queue 220 with the assistance of switching logic 230, while transfers to and from transfer queue 220 are accomplished with the assistance of switching logic 230, free buffer pointer logic 240, transfer queueing controller 250, transfer dequeueing controller 260 and head/tail pointer stores 270, as will be described hereinafter in greater detail. Of course, some discrete information units received at switching backplane interface 210 will not be forwarded, but will instead be filtered, in accordance with a the forwarding rules operative on the switching controller.

Figure 3:
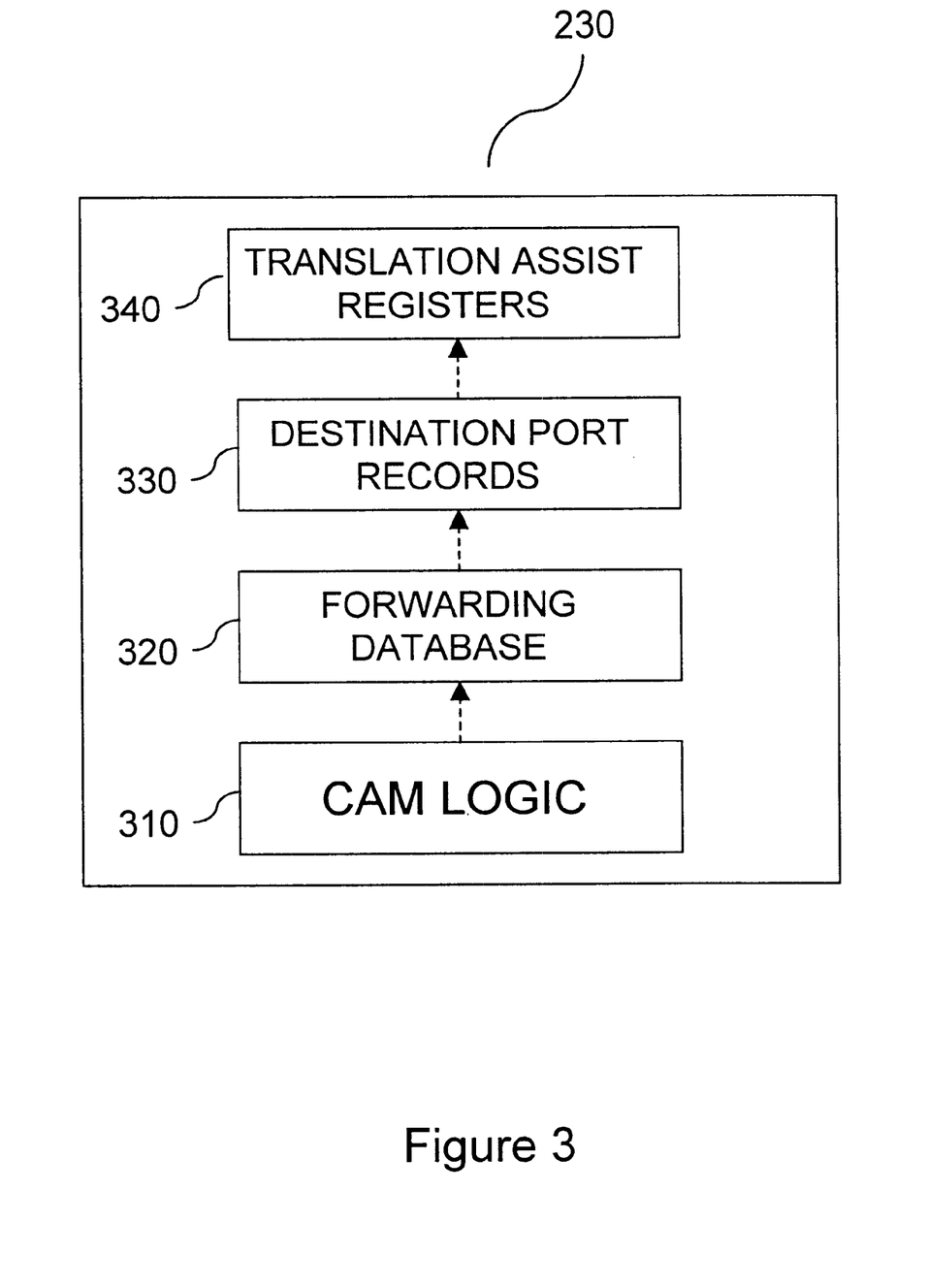
FIG. 3 is a block diagram illustrating in even greater detail the switching logic element of the switching controller section of FIG. 2.

Referring to FIG. 3, switching logic 230 is shown to include content addressable memory (CAM) logic 310, forwarding database 320, destination port records 330 and translation assist registers 340. CAM logic 310 holds, at different indices in a CAM, addresses of nodes residing on the various protocol domains associated with interfaces 280. Therefore, through associative comparison in CAM logic 310, destination addresses from inbound discrete information units are resolvable to particular destination nodes. It will be appreciated, however, that other logic such as a random access memory (RAM) with bit-hashing capabilities may be used as alternatives to CAM logic. Forwarding database 320 includes associated pairs of CAM indices and destination port identifiers. Therefore, through associative comparison in forwarding database 320, destination addresses in inbound discrete information units are indirectly resolvable to destination port identifiers. Destination port records 330 includes associated pairs of destination port identifiers and translation assist register identifiers. Therefore, through associative comparison in destination port records, destination addresses are indirectly resolvable to translation assist register identifiers. Translation assist registers 340 each include a set of translation assist values for a different protocol type. Accordingly, by judiciously configuring CAM logic 310, forwarding database 320 and destination port records 330, destination addresses in inbound discrete information units can be effectively resolved to a protocol-appropriate translation assist value set. Naturally, logic 310, database 320 and records 330 may either be user-configured or auto-configured. Auto-configured source learning is contemplated for the configuration of CAM logic 310.

Figure 4A:
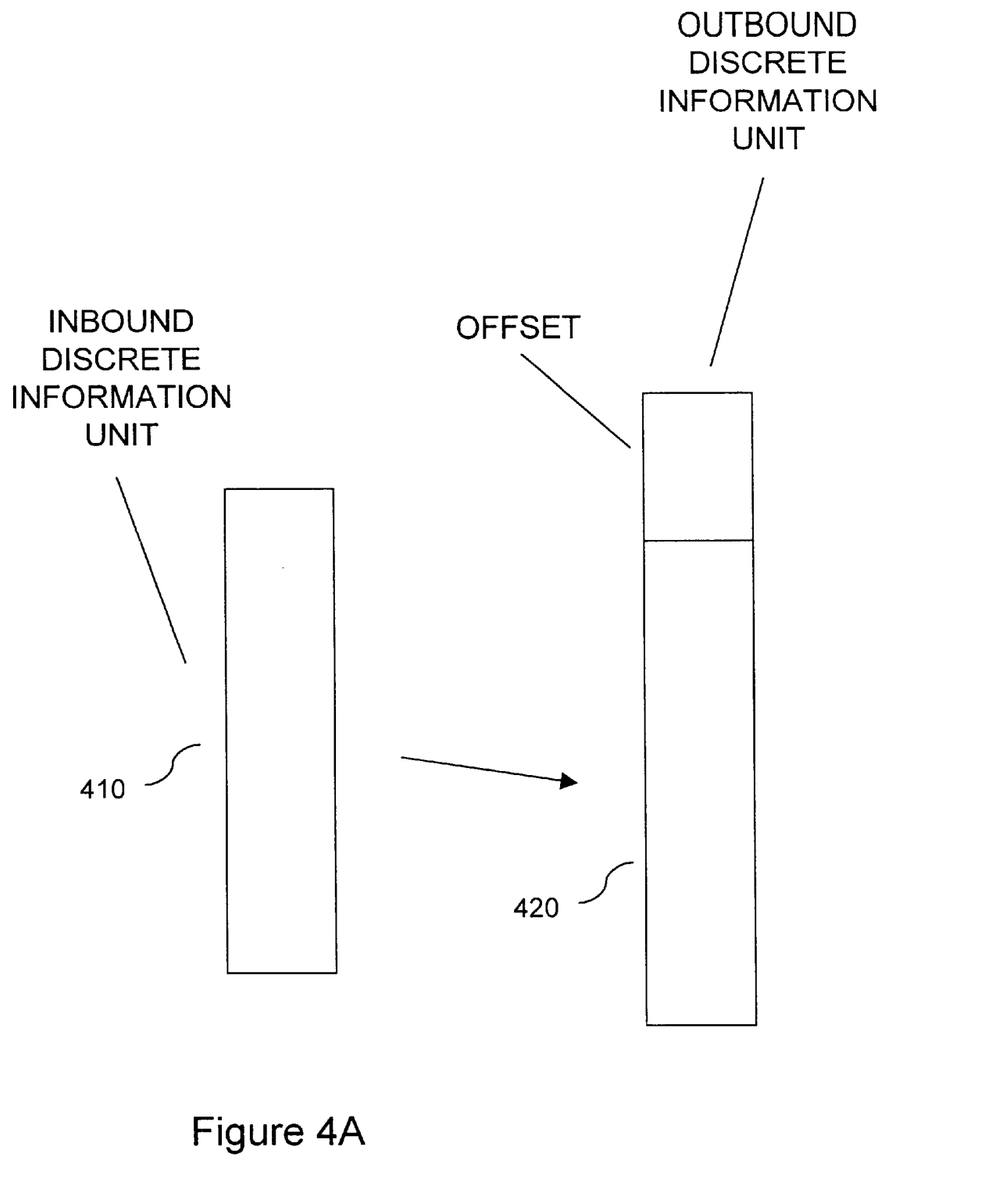
FIG. 4A is a diagram illustrating an inbound discrete information unit and a counterpart "unfragmented" outbound discrete information unit.
Figure 4B:
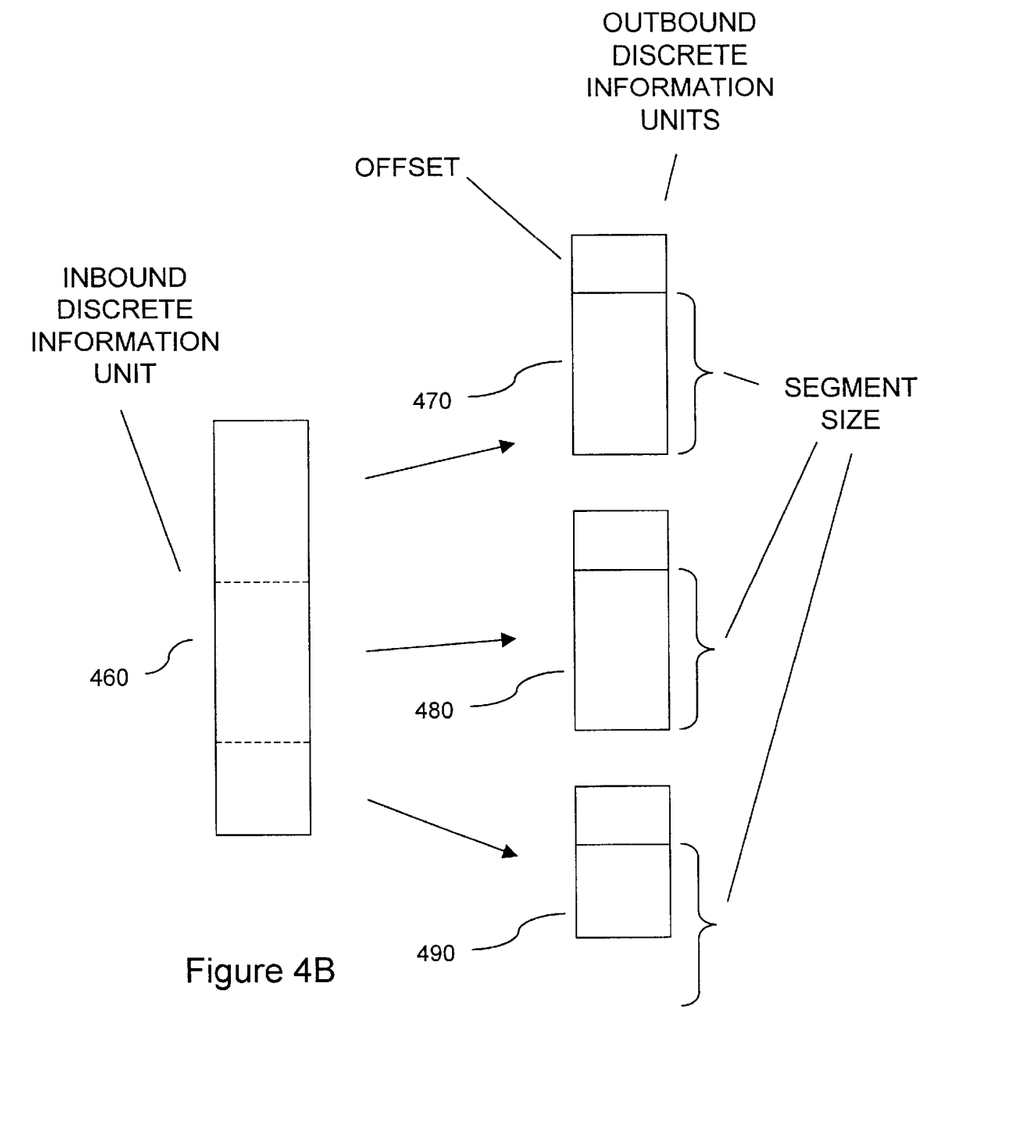
FIG. 4B is a diagram illustrating an inbound discrete information unit and a counterpart "fragmented" outbound discrete information unit.

In a preferred embodiment, each translation assist value set includes a header offset value, a maximum transfer unit value and a segment size value for the protocol type of the set. Translation assist value sets define the general format in which inbound discrete information units are buffered in transfer queue 220 and, correspondingly, the general format in which the discrete information units will eventually be transferred to the interfaces 280 for eventual transmission in the protocol domains supporting the destination node for the discrete information unit. More particularly, header offset values specify the number of constant-byte segments which are to be skipped at the beginning of the first buffer for each outbound discrete information unit of the particular protocol type; maximum transfer unit values specify the maximum allowable length for any single outbound discrete information unit of the particular protocol type; and segment size values specify the number of constant-byte segments which are to be written for each outbound discrete information unit of the particular protocol type. Referring to FIGS. 4A and 4B, inbound discrete information units and their counterpart outbound discrete information units are shown. Turning first to FIG. 4A, an inbound discrete information unit 410 has a counterpart outbound discrete information unit 420 which is unfragmented, from which it can be inferred that the length of the inbound unit 410 did not exceed the resolved maximum transfer unit value. However, the inbound unit 410 and outbound unit 420 differ in that the outbound unit 420 has an offset corresponding to the resolved header offset value. In FIG. 4B, an inbound discrete information unit 460 has a plurality of counterpart outbound discrete information units 470, 480, 490, from which it can be inferred that the length of the inbound unit 460 exceeded the resolved maximum transfer unit value. The outbound units 470, 480, 490 each have an offset corresponding to the resolved header offset value and have a segment length corresponding to the segment size value (except for the last outbound unit, which is residual and therefore may have a smaller length).

Returning now to FIG. 2 in conjunction with FIG. 3, the translation hardware assist operation contemplated in a preferred embodiment of the invention will be illustrated for both fragmented and unfragmented discrete information units. An inbound unit arrives at switching backplane interface 210 in a series of constant-byte segments, or "chunks". A destination address encoded in the inbound discrete information unit, such as a destination media access control (MAC) address, is transferred to CAM logic 310 where an associative comparison with addresses of various nodes residing on protocol domains associated with protocol domain interfaces 280 is performed. If the associative comparison results in a match, the returned CAM index is transferred to forwarding database 320 and a destination port identifier associated with the destination node is resolved. The resolved destination port identifier is referred to destination port records 330 and the translation assist register identifier associated with the destination port identifier is resolved. The header offset, maximum transfer unit, and segment size values are retrieved from the identified translation assist register. Once the translation assist values have been resolved, the next available pointer allocated by free buffer pointer logic 240 is selected and queueing controller 250 starts a DMA transfer of chunks of the discrete information unit into the buffer in transfer queue 220 addressed by the allocated pointer.

Figure 5A:
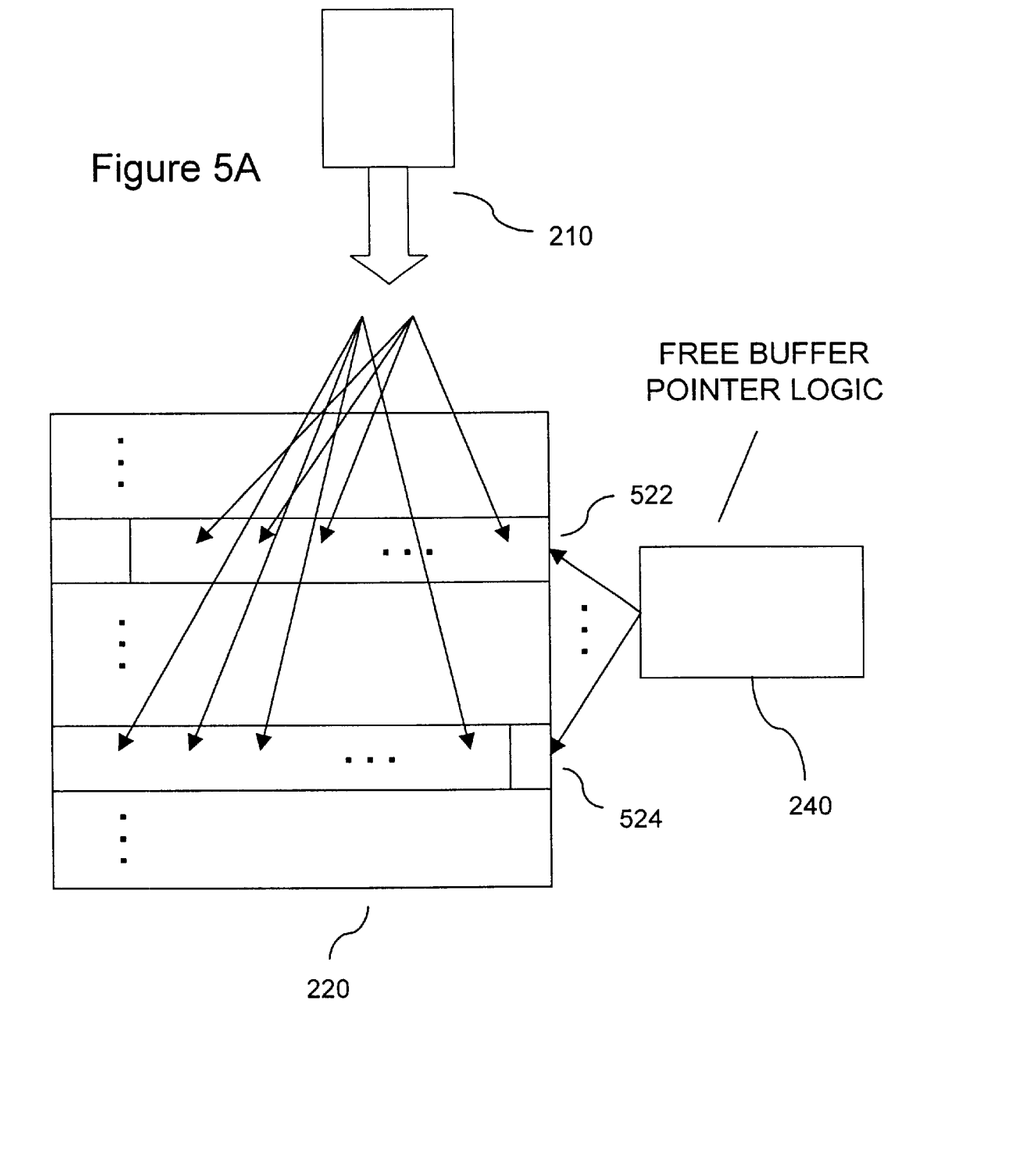
FIG. 5A is a block diagram illustrating the DMA transfer of an unfragmented discrete information unit from the switching backplane interface to the transfer queue in the switching controller section of FIG. 2.

FIG. 5A shows, for an unfragmented discrete information unit, the general manner in which chunks of such units are written to transfer queue 220. After skipping the number of constant-byte segments indicated by the resolved header offset value, chunks of the discrete information unit are written from switching backplane interface 210 to the buffer addressed by the allocated pointer, represented in FIG. 5A by buffer 522. Because in the illustrated example the end of buffer 522 is reached before the entire unit has been written, chunks are written to the buffer addressed by the next pointer allocated by the free pointer buffer logic 240, represented by buffer 524, and so on, until the entire discrete information unit is written into transfer queue 220. Of course, the number of buffers required to queue a given unfragmented discrete information unit may be one or more, depending on the length of the discrete information unit and the length of the buffers allocated by the free buffer pointer logic 240.

Figure 5B:
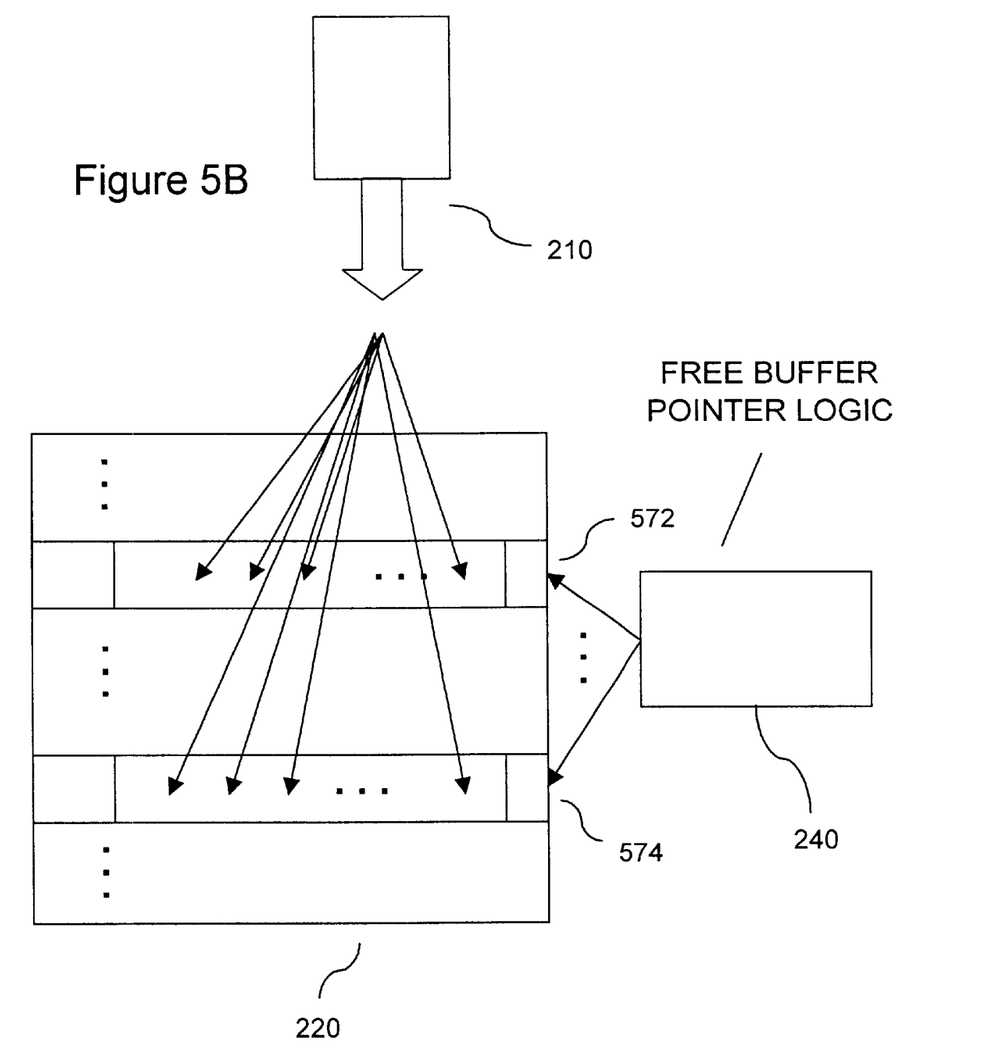
FIG. 5B is a block diagram illustrating the DMA transfer of a fragmented discrete information unit from the switching backplane interface to the transfer queue in the switching controller section of FIG. 2.

FIG. 5B shows, for a fragmented discrete information unit, the general manner in which chunks of such units are written to transfer queue 220. After skipping the number of constant-byte segments indicated by the resolved header offset value, chunks of the discrete information unit are written from switching backplane interface 210 to the buffer addressed by the allocated pointer, represented in FIG. 5B by buffer 572. Once the resolved segment size had been reached, the remainder of the then-current buffer is skipped, and chunks are written to the buffer addressed by the next pointer allocated by the free pointer buffer logic 240, represented in FIG. 5B by buffer 574, after again skipping the number of constant-byte segments indicated by the resolved header offset value, and so on, until the entire discrete information unit has been written into the transfer queue 220. Naturally, the number of buffers required to queue a given fragmented discrete information unit may be two or more, depending on the length of the discrete information unit, the length of the buffers, and the resolved segment size. In the case of both fragmented and unfragmented discrete information units, protocol headers and trailers compatible with the protocol type of the destination protocol domain interface may be constructed, as appropriate, in the residual bytes skipped in the buffers as the units were written to transfer queue 220. Through the foregoing queueing operation, discrete information units are buffered in a manner compatible with the protocol requirements of the destination protocol domain and may be readily dequeued to the destination protocol domain interface for eventual transmission on the destination protocol domain. Over-reliance on CPU intervention in the translation process and all of its attendant inefficiencies are thereby advantageously avoided.

In addition to protocol-appropriate headers written into the residual address spaces in allocated buffers, buffer headers are constructed to link discrete information units into different logical output queues for transfer to destination protocol domain interfaces. Buffer headers are written into address spaces in transfer queue 220 forming counterparts to buffers having outbound data units awaiting release. A separate output queue is constructed for each protocol domain interface. Head/tail pointer stores are maintained for each output queue to track the heads and tails of the output queue. Head/tail pointer stores have stored, for each output queue, a head pointer which addresses the buffer whose buffer header has a pointer to the buffer at the front of the output queue. Head/tail pointer stores also include, for each output queue, a tail pointer which addresses the buffer at the back of the output queue. The tail pointer of an output queue is updated whenever a discrete information unit has been added to the output queue. The head pointer of an output queue is updated whenever a discrete information unit has been read from the output queue to the destination protocol domain interface.

Figure 6:
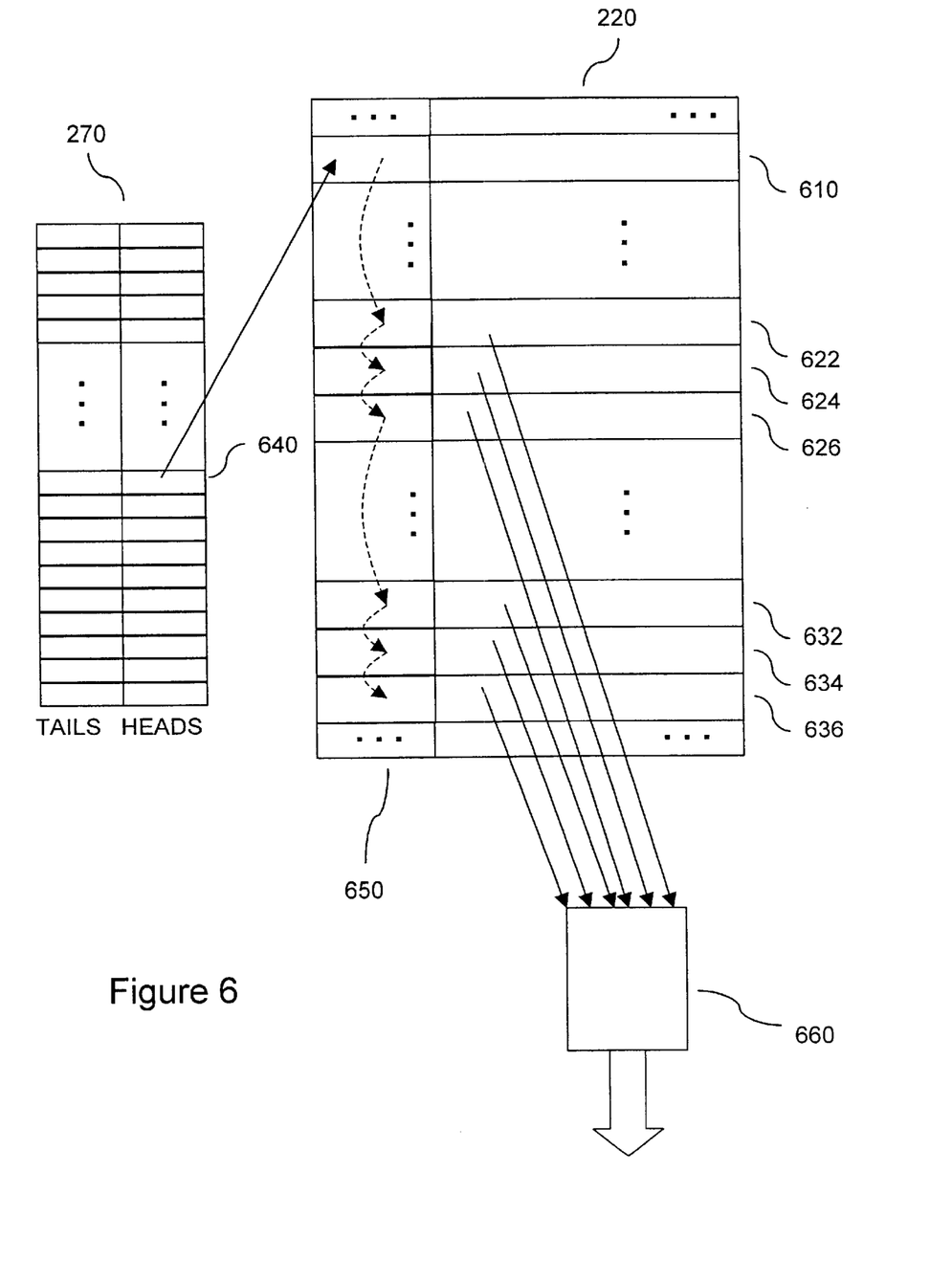
FIG. 6 is a block diagram illustrating the DMA transfer of a discrete information unit from the transfer queue to a protocol domain interface in the switching controller section of FIG. 2.

Dequeueing from transfer queue 220 is triggered by updating the tail pointer of an output queue. Dequeueing controller 260 issues an interrupt command to protocol domain interfaces whose output queue tail pointer has been updated. Interrupted protocol domain interfaces start a first in, first out read of constant-byte chunks of discrete information unit segments from the output queue. If two or more protocol domain interfaces have been interrupted, an arbitration is conducted to grant time-multiplexed control of transfer queue 220 to the competing interfaces for transferring the chunks. The manner in which chunks of outbound discrete information units are read from transfer queue 220 is shown in more detail in FIG. 6. When protocol domain interface 660 has control of transfer queue 220 for making a transfer from its output queue, head pointer store 640 for the output queue is consulted. The pointer stored in store 640 addresses buffer 610 whose header holds a pointer to buffer 622 at the front of the output queue. The pointer is used to address buffer 622 at the front of the queue and chunks are read from buffer 622 to interface 660. Once all chunks have been read from buffer 622, a pointer in the header in buffer 622 is used to address the next buffer 624 in the output queue. Chunks are read from buffer 624 to interface 660. Once all chunks have been read from buffer 624, a pointer in the header of buffer 624 is used to address the next buffer 626 in the output queue and chunks are read from buffer 626 to interface 660, and so on, until the data from all buffers in the output queue have been read to interface 660. The transfer from the next three buffers in the output queue, buffers 632, 634, 636, is illustrated in FIG. 6. Note that buffers in an output queue are not necessarily contiguous, and in the example illustrated in FIG. 6 are not contiguous. Naturally, an output queue may at any given time include one or more buffers. Also, because transfer queue 220 is a shared resource, the read operation from a particular output queue may be interrupted to accommodate reads from other output queues. Residual bytes in the buffers which were not used for protocol headers or trailers are stripped-off the outbound discrete information units during the transfer to interface 660, as appropriate, by consulting a "byte strip" value retained in each buffer header.

Figure 7:
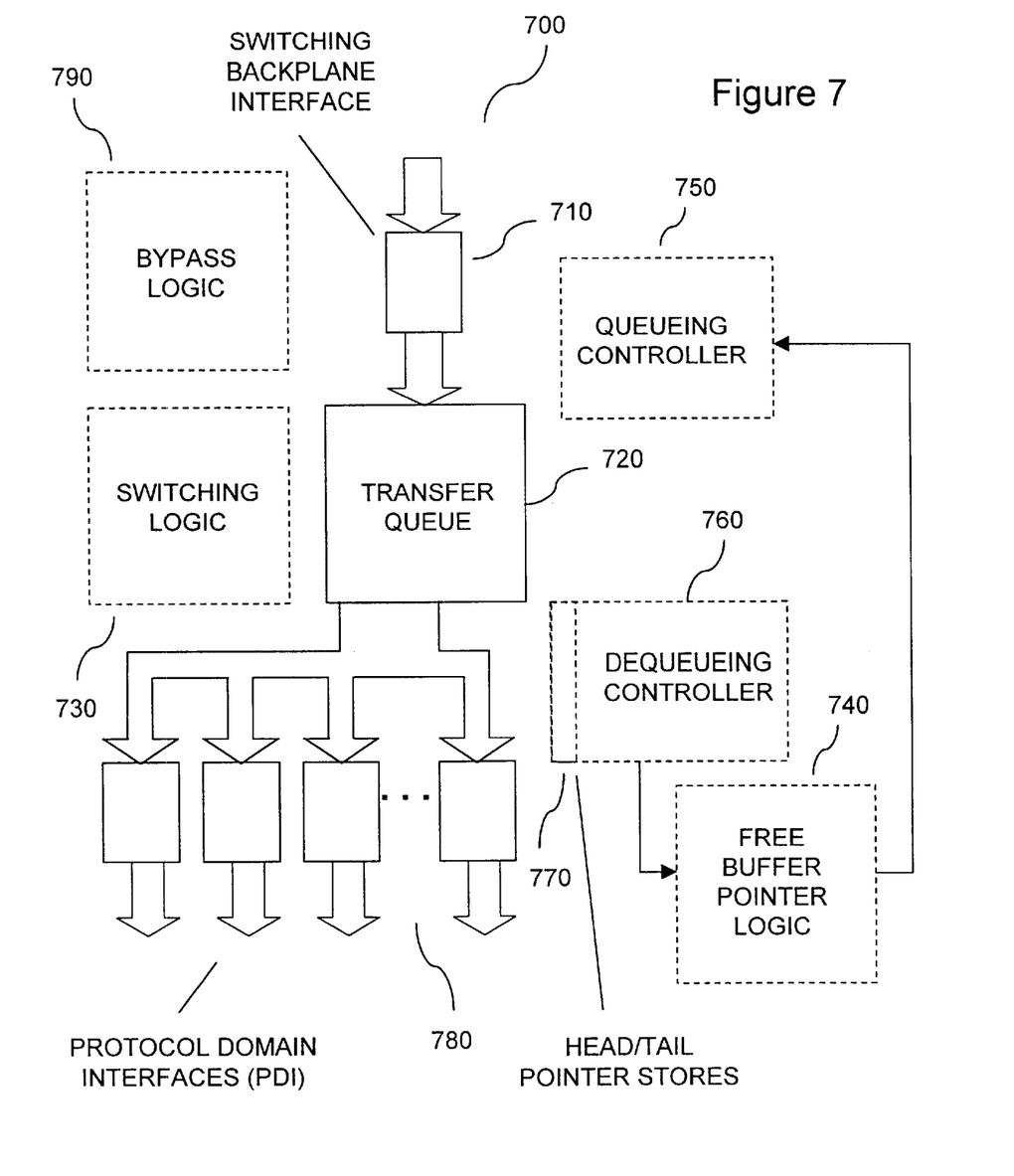
FIG. 7 is a block diagram illustrating a section of a switching controller operative within the switching environment of FIG. 1, in another preferred embodiment.

Referring now to FIG. 7, in another preferred embodiment, a translation hardware assist is implemented with bypass logic 790. Bypass logic 790 includes one or more registers holding a "shortest type" value identifying the protocol type having the shortest maximum transfer unit size operative on the switching controller and a "maximum offset" value identifying the maximum header offset for any protocol type operative on the switching controller. The protocol type identifier in an inbound discrete information unit is transferred to bypass logic 790 where a comparison with the "shortest type" value is made. If the comparison results in a match, it can be inferred that the inbound discrete information unit is sufficiently short that fragmentation will not be required. Therefore, in switching logic 730, the destination port identifier is not resolved to a translation assist register identifier and translation assist register identifiers are not consulted. Instead, the inbound discrete information unit is queued as an unfragmented discrete information unit after skipping the number of bytes corresponding to the maximum header offset value. If the comparison does not result in a match, it can be inferred that fragmentation may be required. In that event, switching logic 730 is consulted as in the preferred embodiment to resolve the header offset, maximum transfer unit and segment size values and queueing from switching backplane interface 710 to transfer queue 720 proceeds as described therein with the assistance of free buffer pointer logic 740 and queueing controller 750. In either event, dequeueing from transfer queue 720 to protocol domain interfaces 780 proceeds as in the preferred embodiment using dequeueing controller 760 and head/tail pointer stores 770. The translation hardware assist with bypass logic has been found particularly advantageous in multi-protocol environments having protocol domains operative in (i) Ethernet and (ii) Token Ring and/or FDDI, where Ethernet packets (which are associated with the protocol having the shortest maximum transfer unit size among those operative protocols) have a relatively high incidence of occurrence and, therefore, fragmentation is required for a relatively small number of packets.

Figure 8:
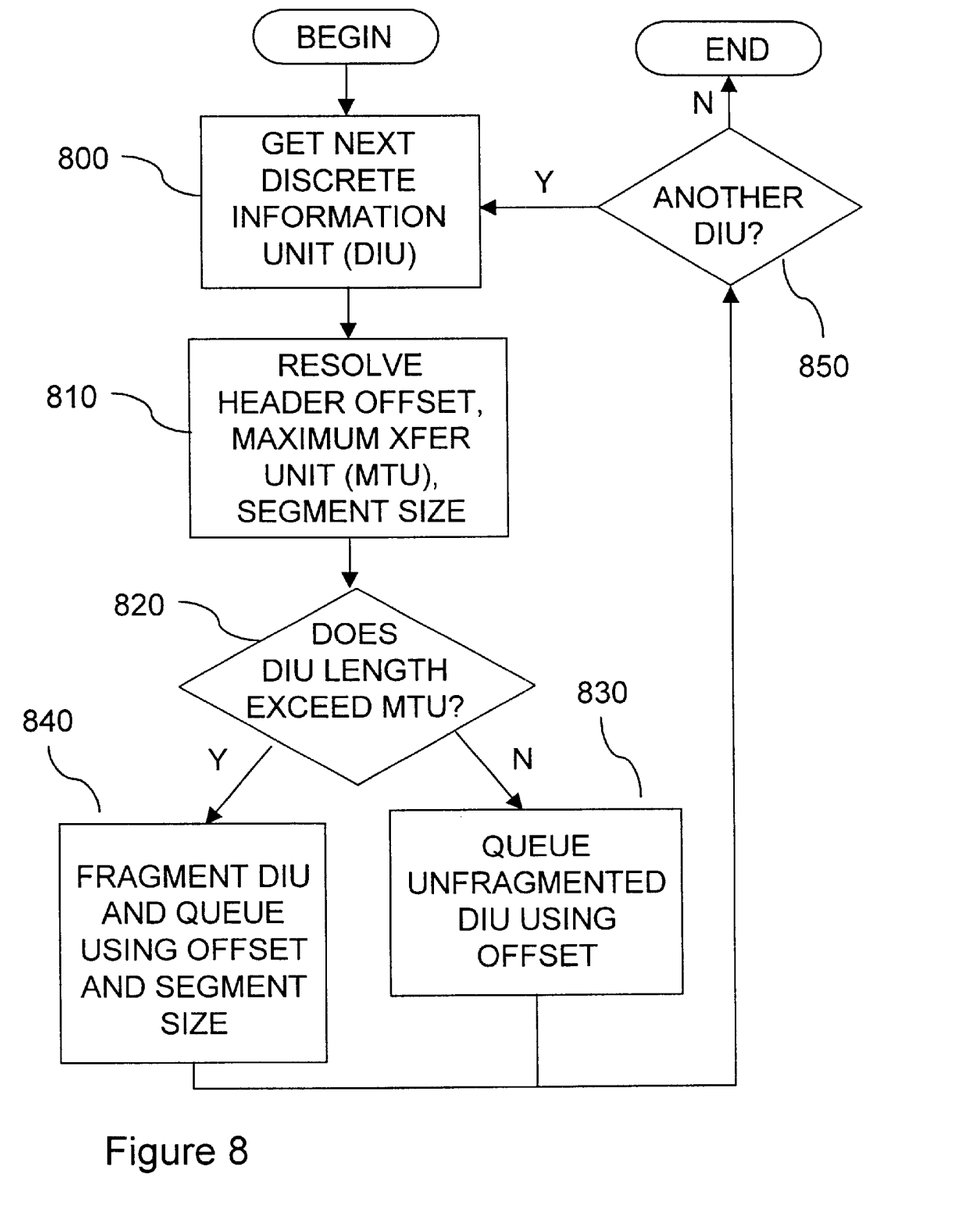
FIG. 8 is a flow diagram describing a protocol translation assist algorithm operative in accordance with a preferred embodiment of the invention.

Turning now to FIG. 8, a flow diagram illustrates a protocol translation assist algorithm operative in accordance with a preferred embodiment of the invention. An inbound discrete information unit is received (800) and the header offset, maximum transfer unit and segments size values are resolved (810). The length of the inbound discrete information unit is compared with the resolved maximum transfer unit size (820). If the maximum transfer unit size is exceeded, the discrete information unit is fragmented into segments of the resolved segment size and the segments are each buffered after a header offset corresponding to the resolved header offset value (840). If the maximum transfer unit size is not exceeded, the unfragmented discrete information unit is buffered after a header offset corresponding to the resolved header offset value (830). In either event, the next inbound discrete information unit, if any, is treated (850).

Figure 9:
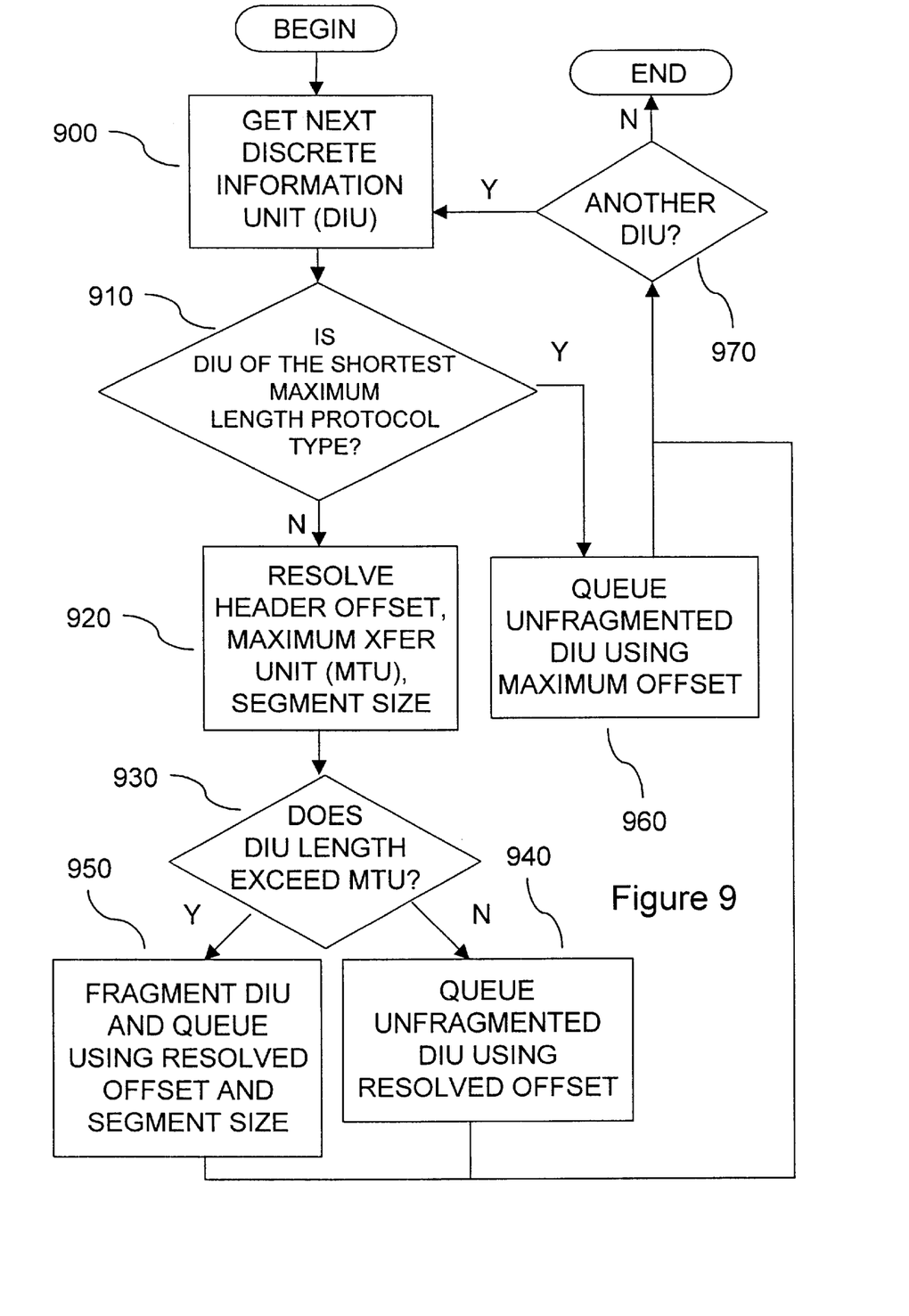
FIG. 9 is a flow diagram describing a protocol translation assist algorithm operative in accordance with another preferred embodiment of the invention.

Referring finally to FIG. 9, a flow diagram illustrates a protocol translation assist algorithm with bypass operative in accordance with another preferred embodiment of the invention. An inbound discrete information unit is received (900) and a bypass check is made to determine if the discrete information unit is of a protocol type which specifies the shortest maximum protocol length for any protocol type operative on the switching controller (910). If the protocol type specifies the shortest maximum protocol length, the unfragmented discrete information unit is buffered after a header offset corresponding to the maximum header offset specified for any protocol type operative on the switching controller (960). If the protocol type does not specify the shortest maximum protocol length, the header offset, maximum transfer unit and segments size values operative in the destination protocol domain are resolved (920) and the length of the inbound discrete information unit is compared with the resolved maximum transfer unit size (930). If the maximum transfer unit size is exceeded, the discrete information unit is fragmented into segments of the resolved segment size and the segments are each buffered after a header offset corresponding to the resolved header offset value (950). If the maximum transfer unit size is not exceeded, the unfragmented discrete information unit is buffered after a header offset corresponding to the resolved header offset value (940). In any event, the next inbound discrete information unit, if any, is treated (970).

It will be appreciated by those of ordinary skill in the art that the invention can be embodied in other specific forms without departing from the spirit or essential character hereof. The present description is therefore considered in all respects illustrative and not restrictive. The scope of the invention is indicated by the appended claims, and all changes that come within the meaning and range of equivalents thereof are intended to be embraced therein.

We claim:

1. A method for assisting switching a discrete information unit of digital data, for use within a switching controller having an input interface and a plurality of output interfaces, wherein the output interfaces are associated with nodes operative in different protocols, and a transfer memory for switching the discrete information unit from an input interface to an output interface, comprising the steps of:
    (a) determining a destination node for the discrete information unit;
    (b) determining a segment size for the discrete information unit through association with the destination node;
    (c) allocating buffers in the transfer memory to the discrete information unit; and
    (d) writing the discrete information unit in the allocated buffers as a series of segments of the segment size.

2. The switching assist method according to claim 1, further comprising the steps of:
    (e) formatting the written segments for the protocol type operative on the destination node; and
    (f) reading the formatted written segments to the destination interface associated with the destination node.

3. The switching assist method according to claim 2, wherein the formatting step comprises writing protocol header information into address spaces preceding the written segments in the allocated buffers.

4. A method for assisting switching a discrete information unit of digital data, for use within a switching controller having an input port and a plurality of output ports, wherein the output ports are operative in different protocols, and a transfer memory for switching the discrete information unit from a source input port to a destination output port, comprising the steps of:
    (a) determining a destination output port for the discrete information unit and one or more translation assist values for the destination output port, the translation assist values including a maximum transfer unit value identifying a maximum length for a unit for transmission on the destination output port and a segment size value identifying an allowable length for a unit for transmission on the destination output port;
    (b) comparing the length of the discrete information unit with the maximum transfer unit value; and (c) if the length of the discrete information unit exceeds the maximum allowable length, writing the discrete information unit to the transfer memory as a series of segments of the segment size, the written segments separated from one another by an amount of address space; and (d) otherwise, writing the discrete information unit to the transfer memory as a single contiguous segment.

5. The switching assist method according to claim 4, wherein the translation assist values further include a header offset value, and wherein each written segment is preceded in memory by a skipped address space of a size indicated by the header offset value.

6. The switching assist method according to claim 5, wherein header information for a written segment is constructed in at least part of a skipped address space.

7. The switching assist method according to claim 6, further comprising:

(e) repeating steps (a) through (d) for a plurality of discrete information units; and (f) reading pairs of headers and segments from the transfer memory to the destination output ports in a predetermined logical order.

8. The switching assist method according to claim 4, wherein the destination output port is determined by association with an identifier in the discrete information unit.

9. The switching assist method according to claim 4, wherein the translation assist values are determined by association with the determined destination output port.

10. The switching assist method according to claim 4, wherein the translation assist values are stored in a register maintained for the protocol type operative on the destination output port.

11. A method for assisting switching a discrete information unit of digital data, for use within a switching controller having an input port and a plurality of output ports, wherein the output ports are operative in different protocols, and a transfer memory for switching the discrete information unit from a source input port to a destination output port, comprising the steps of:

(a) determining a destination output port for the discrete information unit and one or more translation assist values for the protocol type operative on the destination output port, the translation assist values including a maximum transfer unit value identifying a maximum length for a unit of the protocol type and a segment size value identifying an allowable length for a unit of the protocol type;

(b) comparing the length of the discrete information unit with the maximum transfer unit value; and (c) if the length of the discrete information unit exceeds the maximum allowable length, writing the discrete information unit to the transfer memory as a series of segments of the segment size, the written segments separated from one another by an amount of address space; and (d) otherwise, writing the discrete information unit to the transfer memory as a single contiguous segment.

12. The switching assist method according to claim 11, wherein the translation assist values further include a header offset value, and wherein each written segment is preceded in memory by a skipped address space of a size indicated by the header offset value.

13. The switching assist method according to claim 12, wherein header information for a written segment is constructed in at least part of a skipped address space.

14. The switching assist method according to claim 13, further comprising:

(e) repeating steps (a) through (d) for a plurality of discrete information units; and (f) reading pairs of headers and segments from the transfer memory to the destination output port in a predetermined logical order.

15. The switching assist method according to claim 11, wherein the destination output port is determined by association with an identifier in the discrete information unit.

16. The switching assist method according to claim 11, wherein the translation assist values are determined by association with the determined destination output port.

17. The switching assist method according to claim 11, wherein the translation assist values are stored in a register maintained for the protocol type operative on the destination output port.

18. A method for assisting switching a discrete information unit of digital data, for use within a switching controller having an input port and a plurality of output ports, wherein the output ports are operative in different protocols, and a transfer memory for switching the discrete information unit from a source input port to a destination output port, comprising the steps of:

(a) comparing the protocol type of the inbound discrete information unit with a configured protocol type value, the configured value identifying the protocol type which among all protocol types active on any output port specifies the shortest maximum length for a unit for transmission in the protocol type; and (b) if the inbound discrete information unit is of the identified protocol type, writing the discrete information unit in the transfer memory as a single contiguous segment;

(c) otherwise, (i) determining a destination output port for the discrete information unit and one or more translation assist values for the destination output port, the translation assist values including a maximum transfer unit value identifying a maximum length for a unit for transmission on the destination output port and a segment size value identifying an allowable length for a unit for transmission on the destination output port;

(ii) comparing the length of the discrete information unit with the maximum transfer unit value; and (iii) if the length of the discrete information unit exceeds the maximum allowable length, writing the discrete information unit in the transfer memory as a series of segments of the segment size, the written segments separated from one another by an amount of address space; and (iv) otherwise, writing the discrete information unit in the transfer memory as a single contiguous segment.

19. The switching assist method according to claim 18, wherein each segment written pursuant to step (b) is preceded by a skipped address space of a size which corresponds to a header offset value for the protocol type which specifies the largest header offset among all protocol types active on any output port.

20. The switching assist method according to claim 19, wherein header information for a written segment is constructed in at least part of a skipped address space.

21. The switching assist method according to claim 18, wherein the translation assist values further include a header offset value, and wherein each segment written pursuant to step (c) is preceded by a skipped address space of a size indicated by the header offset value.

22. The switching assist method according to claim 21, wherein a header for a written segment is constructed in at least part of a skipped address space.

23. The switching assist method according to claim 18, further comprising:

(e) repeating steps (a) through (c) for a plurality of discrete information units; and (f) reading pairs of headers and segments from the transfer memory to the destination output ports in a predetermined logical order.

* * * * *